(12) United States Patent
Chan

(10) Patent No.: US 6,662,686 B2
(45) Date of Patent: Dec. 16, 2003

(54) AUTOMATIC MOTOR-OUTPUT-REDIRECTION SYSTEM

(76) Inventor: Kwok Hung Chan, Blk B, 12/F, Tower 4, Park Belvedere, Ma On Shan, N.T., Hong Kong (HK)

( * ) Notice: Subject to any disclaimer, the term of this patent is extended or adjusted under 35 U.S.C. 154(b) by 48 days.

(21) Appl. No.: 10/101,897

(22) Filed: Mar. 21, 2002

(65) Prior Publication Data

US 2003/0177862 A1 Sep. 25, 2003

(51) Int. Cl.[7] .......................... B23Q 17/00; F16H 27/06
(52) U.S. Cl. ........................................ 74/820; 74/665 F
(58) Field of Search ........................... 74/436, 665 F, 74/665 G, 665 GA, 813 R, 814–818, 820

(56) References Cited

U.S. PATENT DOCUMENTS

| | | | | |
|---|---|---|---|---|
| 1,985,477 A | * | 12/1934 | Wolf | 451/219 |
| 2,669,226 A | * | 2/1954 | Adams | 415/51 |
| 2,868,032 A | * | 1/1959 | Miller | 74/436 |
| 3,590,661 A | * | 7/1971 | Chaveneaud | 66/132 R |
| 4,282,778 A | * | 8/1981 | Yang et al. | 74/820 |
| 5,916,324 A | * | 6/1999 | Baumann | 74/84 R |

* cited by examiner

*Primary Examiner*—Chong H. Kim
(74) *Attorney, Agent, or Firm*—Raymond Y. Chan; David and Raymond Patent Group

(57) ABSTRACT

An automatic motor-output-redirection system includes an automatic motor-output-redirection mechanism and a motor control unit for controlling the automatic motor-output-redirection mechanism which includes a turntable base arranged to be driven to rotate by a motor assembly. A primary Output shaft is coupled with the motor assembly in rotatable movable manner. A second idle gear is rotatably supported on the turntable base to couple with the primary output shaft. A plurality of the planetary output shafts are coaxially supported by the casing at positions around the turntable assembly, wherein the primary output shaft is arranged to drive the second idle gear to move between an engagement position that one of the planetary output shafts is driven to rotate and a disengagement position that each of the planetary output shafts is in an idle manner.

20 Claims, 20 Drawing Sheets

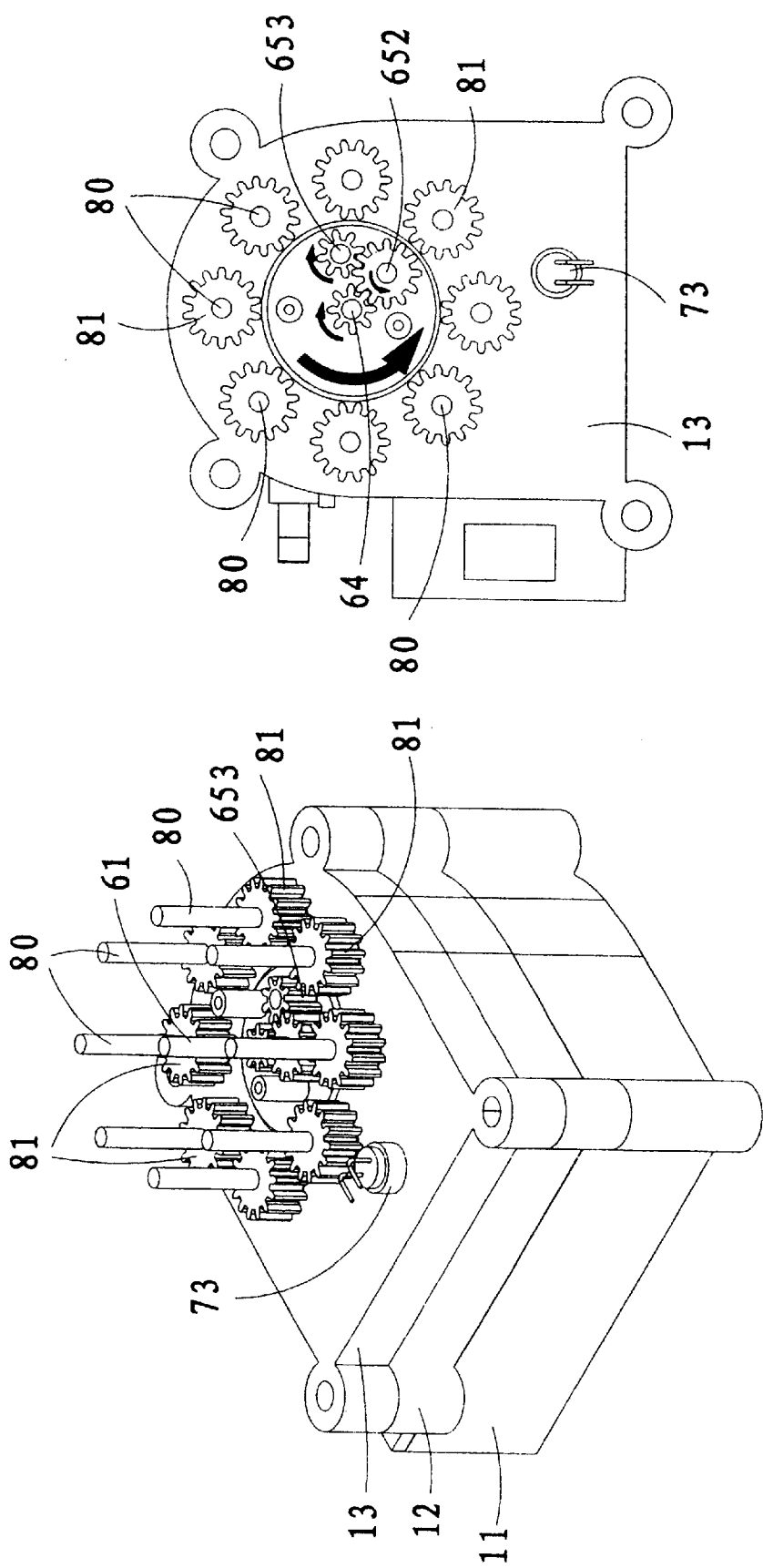

| Input motion of the motor shaft 42 of the motor assembly 40 | Output motion of the second output gear 24 of the first output gear assembly 20 | Output motion of the second driven gear 32 of the second output gear assembly 30 |
|---|---|---|
| Rotating direction    CCW | CCW | CCW |
| Rotating direction    CW | CW | Stop; No rotation |

FIG. 13

| | Input motion of the motor shaft 42 of the motor assembly 40 | Input motion of the second output gear 24 of the first output gear assembly 20 | Output motion of the primary output shaft 61 | Input motion of second driven gear 32 of the second output gear assembly 30 | Output motion of the indexing gear 70 | Output motion of the turntable base 63 |
|---|---|---|---|---|---|---|
| Rotating direction | CCW | CCW | CW | CCW | CW | CCW in step |
| Rotating direction | CW | CW | CCW | Stop; no rotation | Stop; no rotation | Stop; no rotation |

FIG. 14

| Input motion of primary output shaft 61 | Output motion of the swinging arm 651 | Output motion of the planetary output shaft 80 |
|---|---|---|
| Rotating direction CW | Disengage the second idle gear 653 with the planetary output shafts 80 | Stop; No rotation |
| Rotating direction CCW | Engage the second idle gear 653 with one of the planetary output shafts 80 | Corresponding planetary output shaft rotate in CW |

FIG. 15

| | Input motion of the motor shaft 42 | Output motion of the second output gear 24 | Output motion of the primary output shaft 61 | Output motion of the second driven gear 32 | Output motion of the indexing gear 70 | Output motion of the turntable base 63 | Output motion of the swinging arm 651 | Output motion of the planetary output shaft 80 |
|---|---|---|---|---|---|---|---|---|
| Rotating direction | CCW | CCW | CW | CCW | CW | CCW in step | Disengage the second idle gear 653 with the planetary output shafts 80 | Stop; No rotation |
| Rotating direction | CW | CW | CCW | Stop; no rotation | Stop; no rotation | Stop; no rotation | Engage the second idle gear 653 with one of the planetary output shafts 80 | Corresponding planetary output shaft rotate in CW |

AUTOMATIC MOTOR-OUTPUT-REDIRECTION SYSTEM

BACKGROUND OF THE PRESENT INVENTION

1. Field of Invention

The present invention relates to an automatic Motor-Output-Redirection system. (i.e. automatic MOR system), and more to particularly to an automatic motor-output-redirection mechanism with multiple output, which comprises a motor assembly having a least two output shafts selectively driven to rotate, so as to selectively control different mechanical devices by connecting to the corresponding output shaft.

2. Description of Related Arts

A motor for converting electrical energy to mechanical energy powers most of the mechanical devices. Conventionally, the motor comprises a rotor for transmitting mechanical work, electric circuit terminals for inputting electrical energy, and an induction means for generating magnetic field. As the electrical energy is input through the electric circuit terminals, a magnetic field is generated by the induction means so as to generate magnetic force exerted on the rotor. The rotor will be rotated through the magnetic field by means of the magnetic force and generate mechanical energy. Therefore, the mechanical device can be operated by connecting to the rotor of the motor.

However, the conventional motor has a major drawback. Since the conventional motor comprises one output shaft extended from the rotor, a clockwise motion or an anti-clockwise motion can be produced by the output shaft to operate the mechanical device in two different motions only, e.g. turn left and right, or move forward and backward. Even though a gear-changing unit is engaged with the output shalt to alter the mechanical work to another mechanical device, only manual gear-shifting is possible. Therefore, it is impossible to operate the more than two mechanical devices automatically and selectively unless two or more motors are incorporated with the external mechanical devices respectively.

For example, a mechanical device comprises a lifting arm to provide a three dimensional mechanical operations which are up and down, left and right, and extending mechanical operations. In order to achieve the three-dimensional mechanical operations. at least three motors are employed in the mechanical device to control the up and down, left and right, and extending operations respectively. As the motor is an expensive component, the manufacturing cost of the mechanical device that has three motors should be high. By using our automatic motor-output-redirection mechanism, we are capable of using a single motor to control that device to have up, down, left, right, extending operations and even more.

SUMMARY OF THE PRESENT INVENTION

A main object of the present invention is to provide an automatic motor-output-redirection system, which provides more than two single motions for different mechanical operations by using a single motor, so as to minimize the numbers of motor to incorporate with any mechanical device. In other words, it saves money.

Another object of the present invention is to provide an automatic motor-output-redirection system, which comprises at least two output shafts to be selectively driven by a motor assembly to rotate, so as to selectively control different mechanical operations by connecting to the corresponding output axle.

Another object of the present invention is to provide an automatic motor-output-redirection system, wherein a plurality of planetary output gears are selected and automatically engaged with a turntable assembly to drive the corresponding output shaft to rotate.

Another object of the present invention is to provide an automatic motor-output-redirection system, wherein several mechanical operations can be operated by one motor so as to minimize the installation space for the mechanical device.

Accordingly, in order to accomplish the above objects, the present invention provides an automatic motor-output-redirection system, comprising:

a motor control unit comprising a power supply and a control panel; and an automatic motor-output-redirection mechanism, comprising:

a casing having a motor cavity;

a motor assembly, which is supported in the motor cavity of the casing and electrically connected to the power supply, wherein the motor assembly is controlled by the control panel for providing a rotational shalt force;

a turntable assembly, comprising:

a turntable base rotatably supported in the casing wherein the turntable base is arranged to be driven to rotate by the motor assembly;

a primary output shaft, which is coaxially mounted to the turntable base in a rotatably movable manner, having an upper portion extended to an exterior of the casing and a lower end coupling with the motor assembly to drive the upper portion of the primary output shaft to rotate; and a second rotatable output assembly comprising, a second idle gear which is rotatably supported on the turntable base to couple with the primary output shaft; and a plurality of the planetary output shafts coaxially supported by the casing at positions around the turntable assembly, wherein the primary output shaft is arranged to drive the second idle gear to move between an engagement position and a disengagement position, wherein at the engagement position, the turntable base is rotatably moved to a position that the second idle gear is engaged with one of the planetary output shafts to drive the corresponding planetary output shaft to rotate, and at the disengagement position, the second idle gear is disengaged with the planetary output shafts, so that each of the planetary output shafts is in an idle manner.

BRIEF DESCRIPTION OF THE DRAWINGS

FIGS. 11A and 11B illustrate a cog gear disengaged with the planetary output gears according to the above preferred embodiment of the present invention.

FIG. 13 is a first table illustrating mechanism movements in a base of the automatic motor-output-redirection mechanism according to the above preferred embodiment of the present invention.

FIG. 14 is a second table illustrating mechanism movements in a first housing of the automatic motor-output-redirection mechanism according to the above preferred embodiment of the present invention.

FIG. 15 is a third table illustrating mechanism movements in a second housing of the automatic motor-output-redirection mechanism according to the above preferred embodiment of the present invention.

FIG. 16 is a fourth table which is a summary of mechanism movements the automatic motor-output-redirection mechanism according to the above preferred embodiment of the present invention.

DETAILED DESCRIPTION OF THE PREFERRED EMBODIMENT

Figure 1:
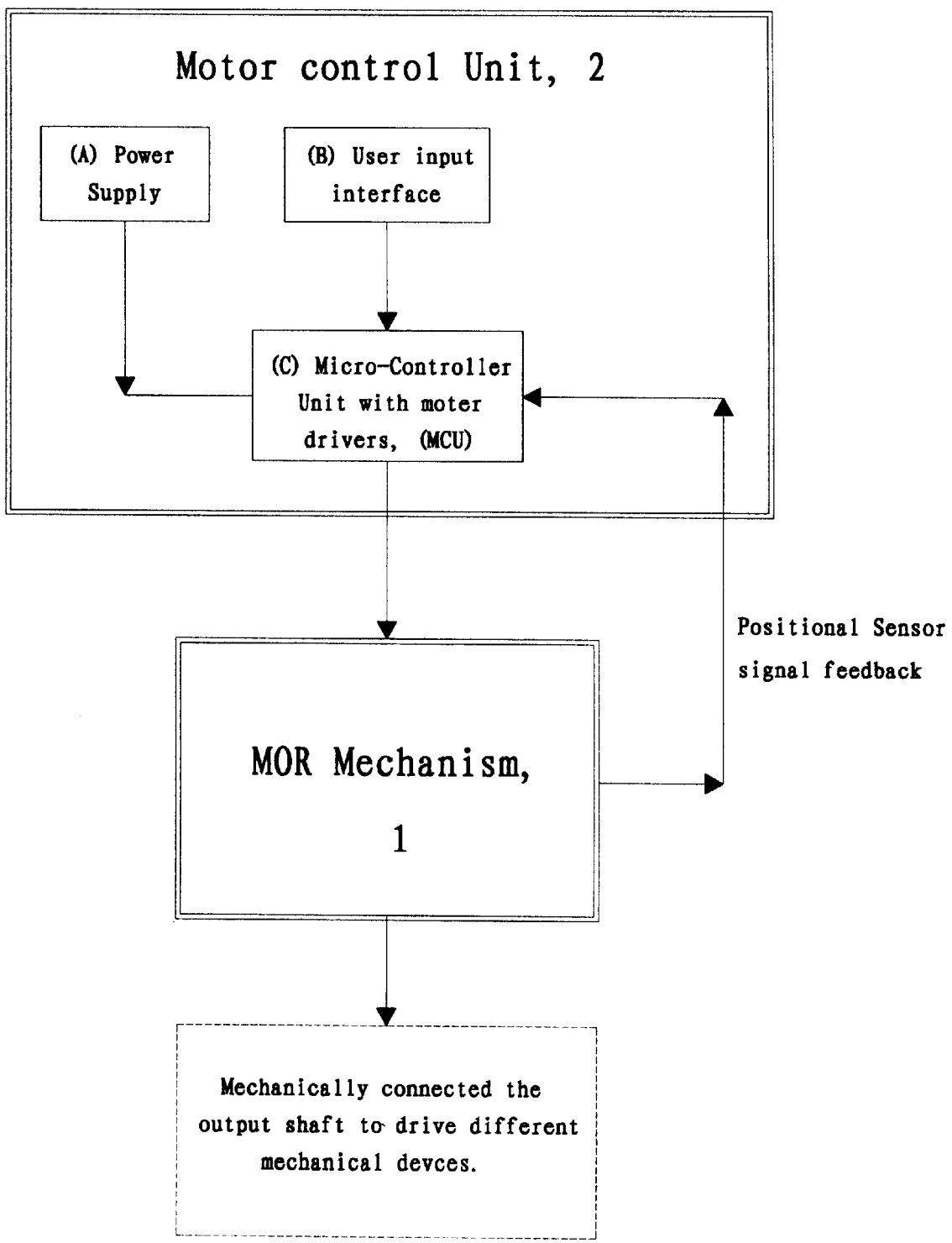
FIG. 1 is a block diagram of an automatic motor-output-redirection system according to a preferred embodiment of the present invention.
Figure 2:
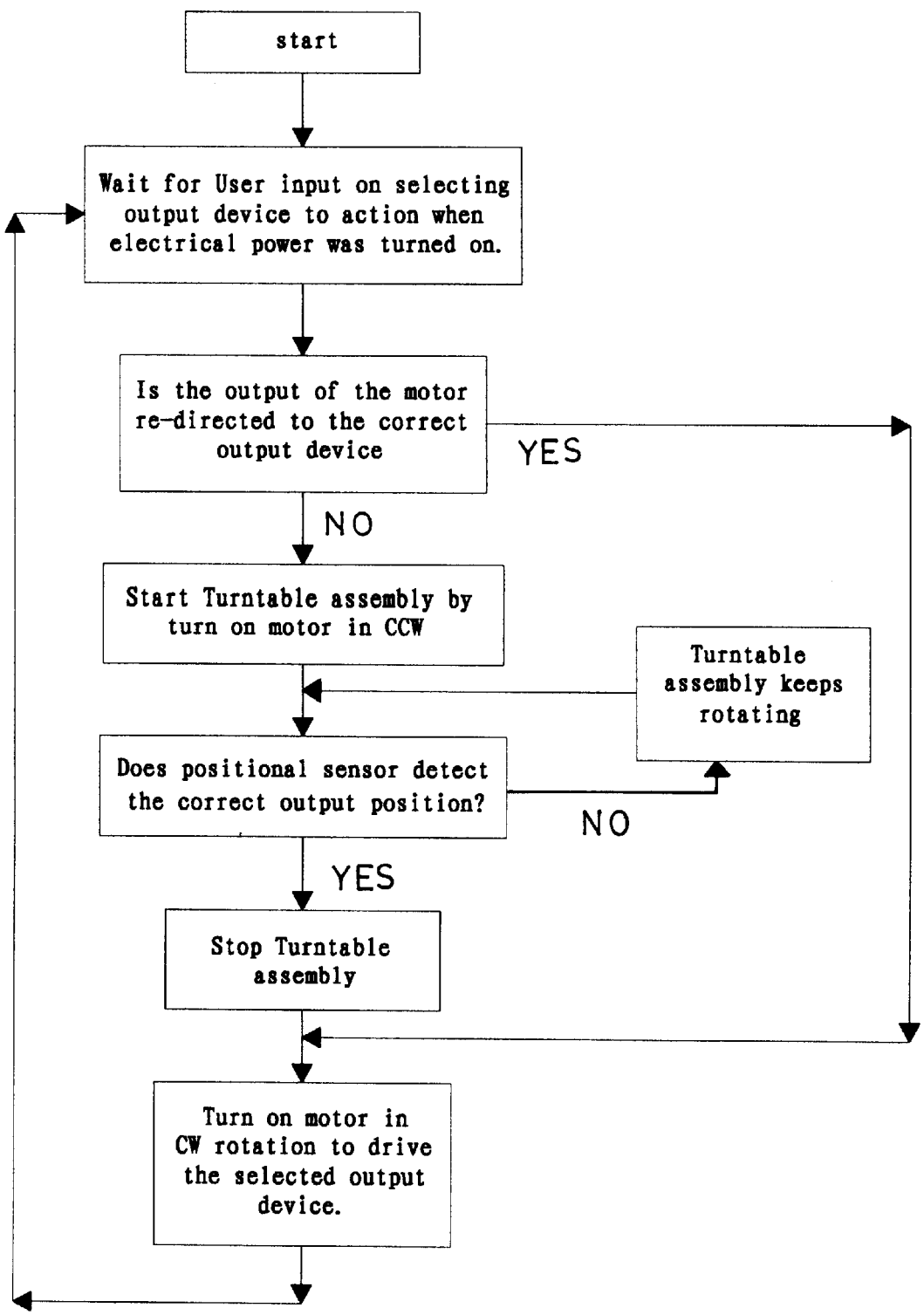
FIG. 2 is a flow chart of the automatic motor-output-redirection system according to the above preferred embodiment of the present invention.
Figure 3:
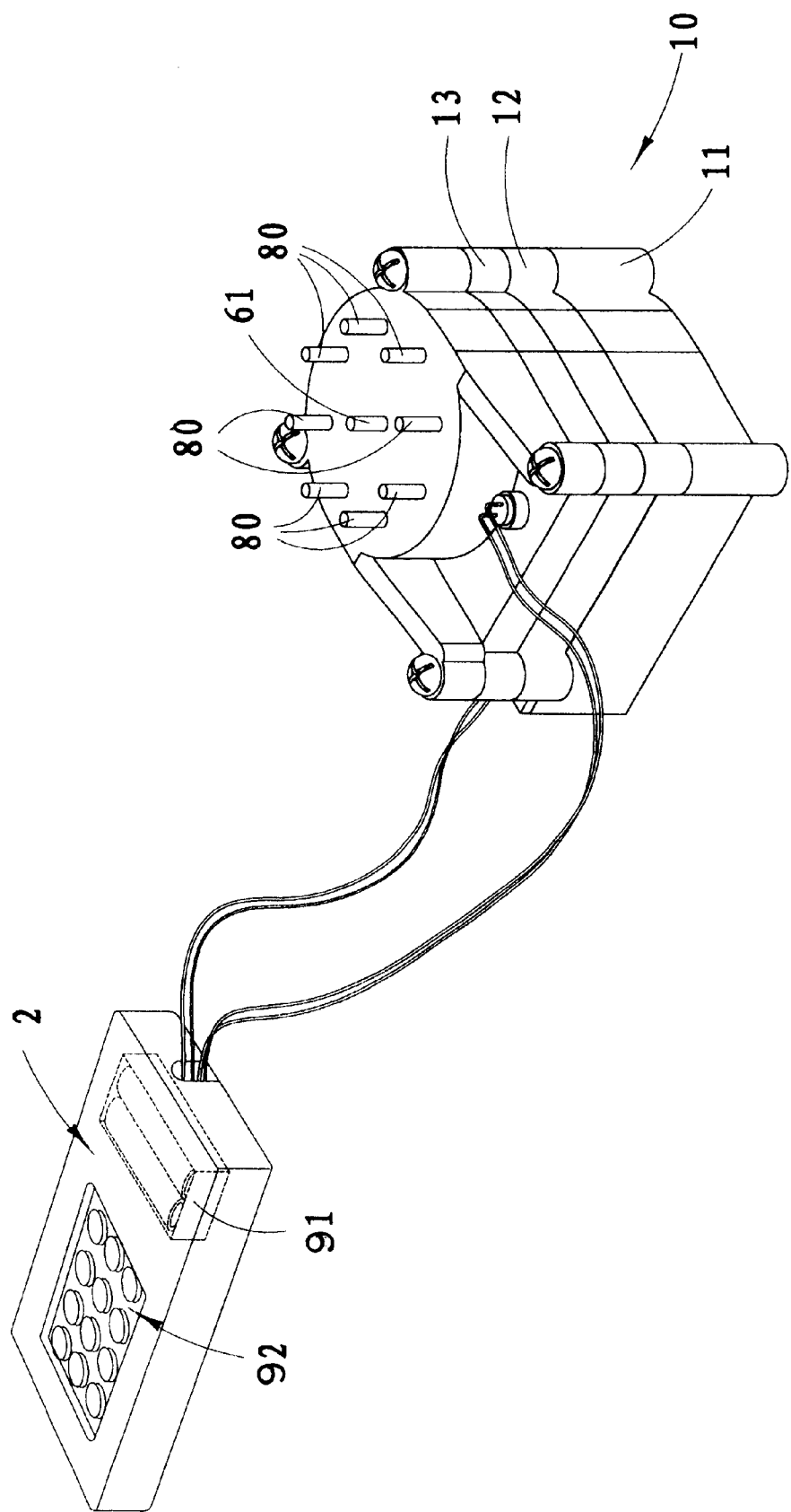
FIG. 3 is a perspective view of an automatic motor-output-redirection mechanism according to the above preferred embodiment of the present invention.

Referring to FIGS. 1 through 12 of the drawings, an automatic motor-output-redirection system comprises an automatic motor-output-redirection mechanism 1 and a motor control unit 2 arranged for controlling the automatic motor-output-redirection mechanism.

The automatic motor-output-redirection mechanism 1 comprises a casing 10 comprising a base 11 having a motor cavity 111 and a sear cavity 12, a first housing 12 supported on the base 11, and a second housing 13 supported on the first housing 12, and a first and second output gear assemblies 20, 30 supported in the gear cavity 112 of the base 11.

A motor assembly 40 comprises a motor 41 disposed in the motor cavity 111, a motor shaft 42 operatively extended from the motor 41 for providing a rotational shaft force, and a worm gear 43 affixed to a free end of the motor shaft 42.

Figure 4A:
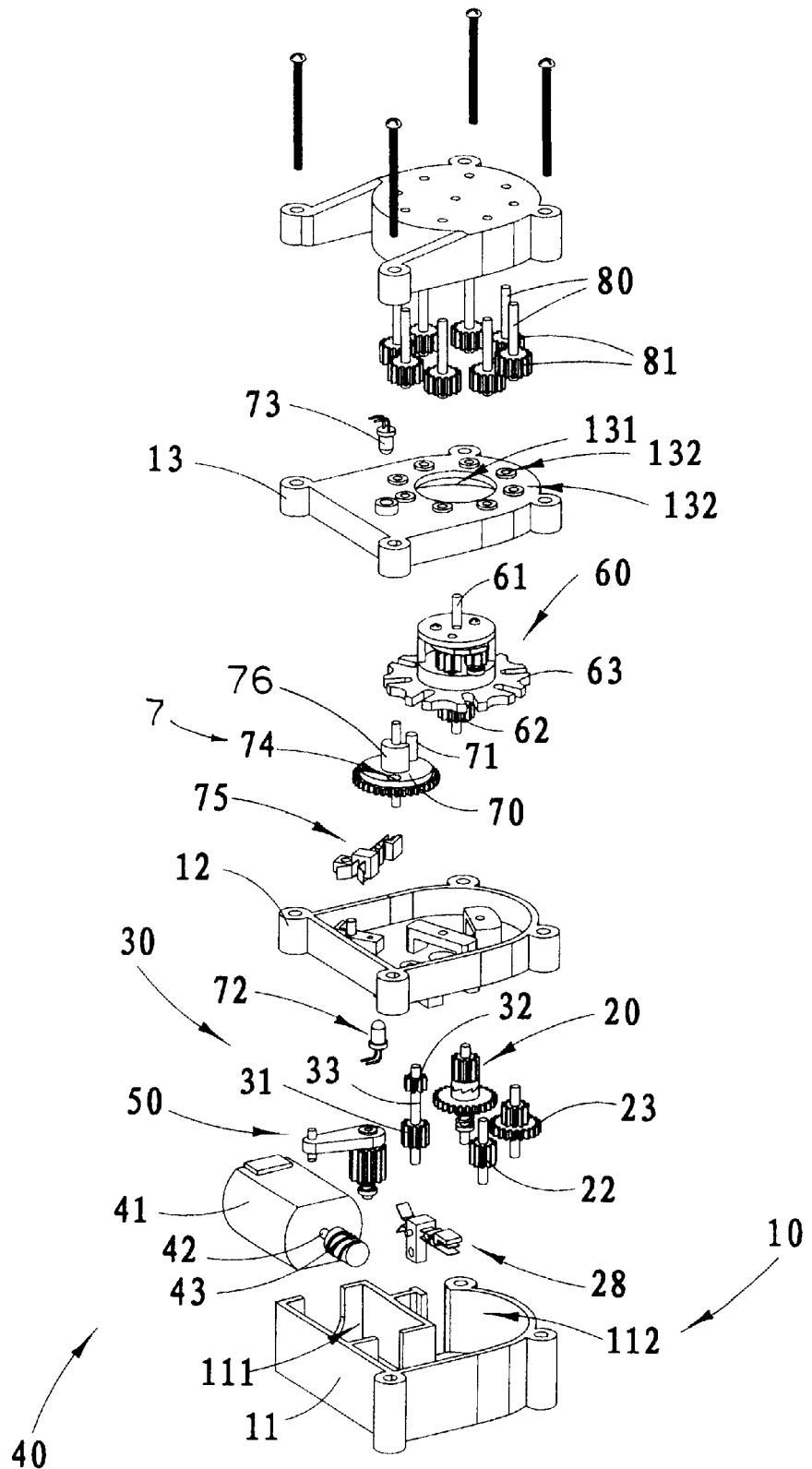
FIG. 4A is a front exploded perspective view of the automatic motor-output-redirection mechanism according to the above preferred embodiment of the present invention.
Figure 4B:
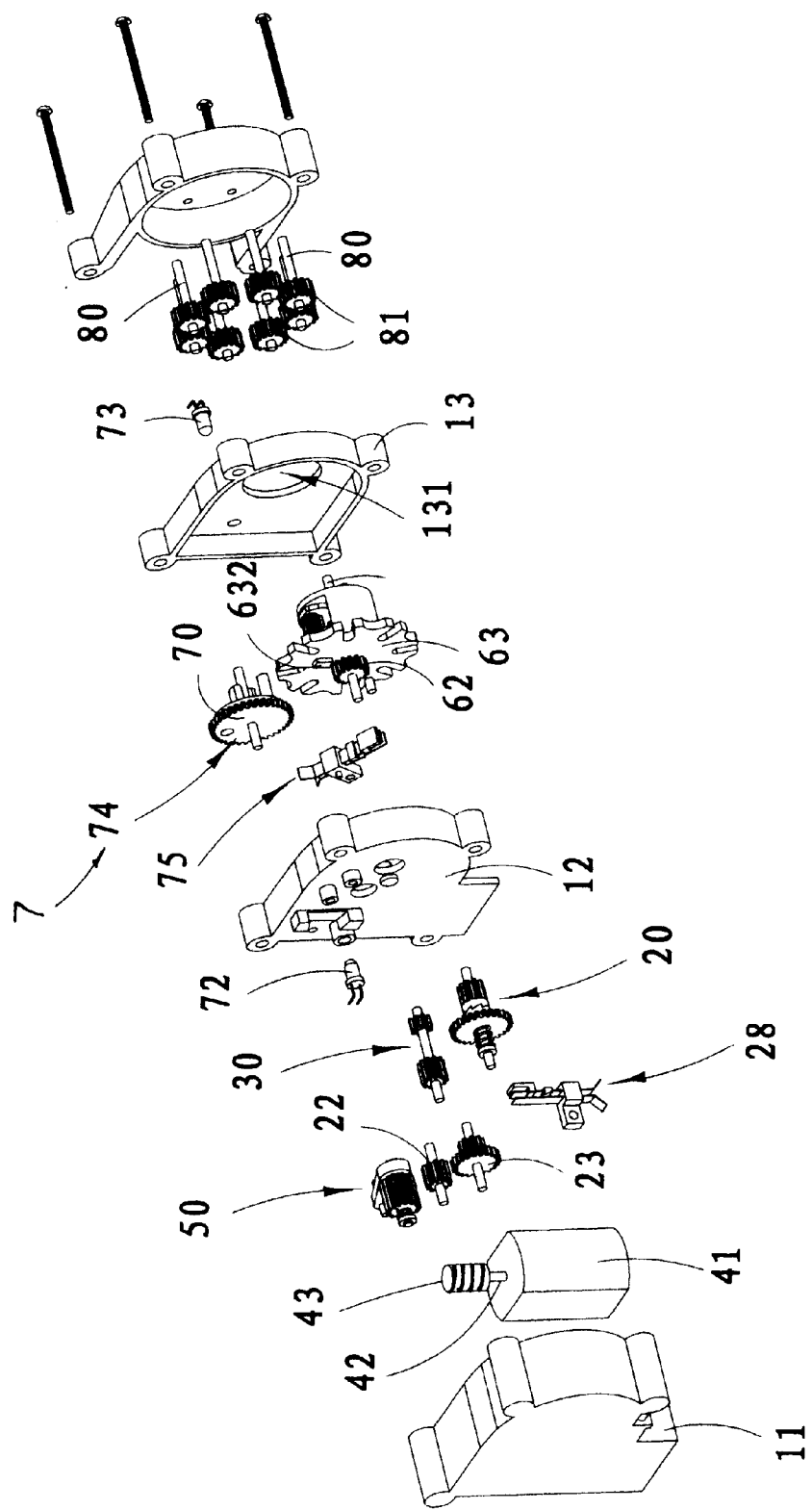
FIG. 4B is a rear exploded perspective view of the automatic motor-output-redirection mechanism according to the above preferred embodiment of the present invention.
Figure 4C:
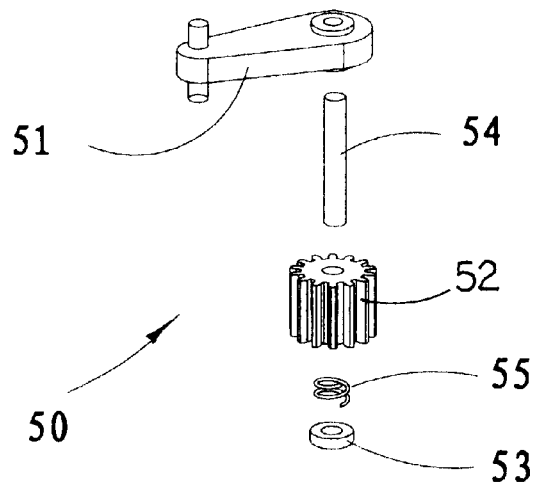
FIG. 4C is an exploded perspective view of a first rotatable assembly of the automatic motor-output-redirection mechanism according to the above preferred embodiment of the present invention.

A first rotatable assembly 50 comprises a floating arm 51 supported on the base 11 in a pivotally movable manner and a cog gear 52 rotatably mounted on a tree end of the floating arm 51 and rotatably engaged with the worm gear 43 for selectively engaging with the first and second output gear assemblies 20, 30 for transferring an energy from the motor 41 to the first and second output gear assemblies 20, 30 through the motor shaft 42, as shown in FIG. 4C.

A turntable assembly 60, which is supported on the first housing 12, comprises a turntable base 63 rotatably supported in the casing 10 wherein the turntable base 63 is arranged to be driven to rotate by the motor assembly 40, a primary output shaft 61, which is coaxially mounted to the turntable base 63 in a rotatably movable manner, having an upper portion extended to an exterior of the casing 10 and a lower end coupling with the motor assembly 40 to drive the upper portion of the primary output shaft 61 to rotate, and a second rotatable output assembly 65 comprising a second idle gear 653 rotatably supported on the turntable base 63 to couple with the primary output shaft 61.

The turntable assembly 60 further comprises an input gear 62 which is affixed to the lower end of the primary output shaft 61 and rotatably engaged with the first output gear assembly 20, so as to drive the primary output shaft 61 to rotate vial the input gear 62.

The automatic motor-output-redirection mechanism 1 further comprises an indexing gear 70 arranged to rotatably engaged the turntable base 63 with the second gear assembly 30 and a plurality of the planetary output shafts 80 rotatably supported on the casing 10 wherein a plurality of planetary output gears 81 affixed to lower ends of the planetary output shafts 80 respectively and arranged to be driven by the turntable assembly 60 to drive the planetary output shafts 80 to rotate. Accordingly, the planetary output shafts 81 are coaxially supported on the second housing 13 at positions around the turntable assembly 60.

The motor control unit 2 comprises a power supply 91 electrically connected to the motor 41 and a control panel 92 arranged for selectively operating the motor 41 to drive the motor shaft 42 in a forward direction and a reverse direction, so as to drive the primary output shaft 61 to rotate. Accordingly, the primary output shaft 61 is arranged to drive the second idle gear 653 to move between an engagement position and a disengagement position, wherein at the engagement position, the turntable base 63 is rotatably moved to a position that the second idle gear 653 is engaged with one of the planetary output shafts 80 to drive the corresponding planetary output shaft 80 to rotate, and at the disengagement position, the second idle gear 653 is disengaged with the planetary output shafts 80, so that each of the planetary output shafts 80 is in an idle manner.

According to the preferred embodiment, the control panel 92 of the motor control unit 2 is an electronic device which has a user interface and a Micro-controller unit, wherein the user interface, such as a keyboard, is used for a user to input a command and the Micro-controller unit is used for controlling and monitoring the automatic motor-output-redirection mechanism 1, as shown in FIG. 1.

When an input signal is inputted from the control panel 92 of the motor control unit 2 to the automatic motor-output-redirection mechanism 1, the motor 41 is controlled to drive the motor shaft 42 to rotate in the forward direction and the reverse direction, i.e. a clockwise direction and a counter clockwise direction respectively.

The first rotatable assembly 50 further comprises a locking metal bushing 53, a shaft body 54 having an upper end affixed to the free end of the floating arm 51 for coaxially mounting the cog gear 52 to the shaft body 54 in a rotatably movable manner, and a compressive spring 55 mounted on the shaft body 54 between the locking metal bushing 53 and the cog gear 52 for applying an urging pressure against the cog gear 52.

Figure 4D:
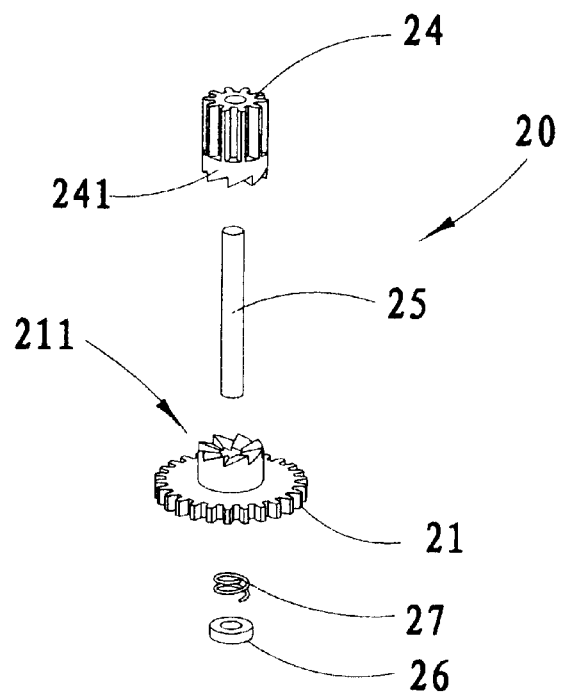
FIG. 4D is an exploded perspective view of a first output gear assembly of the automatic motor-output-redirection mechanism according to the above preferred embodiment of the present invention.
Figure 5A:
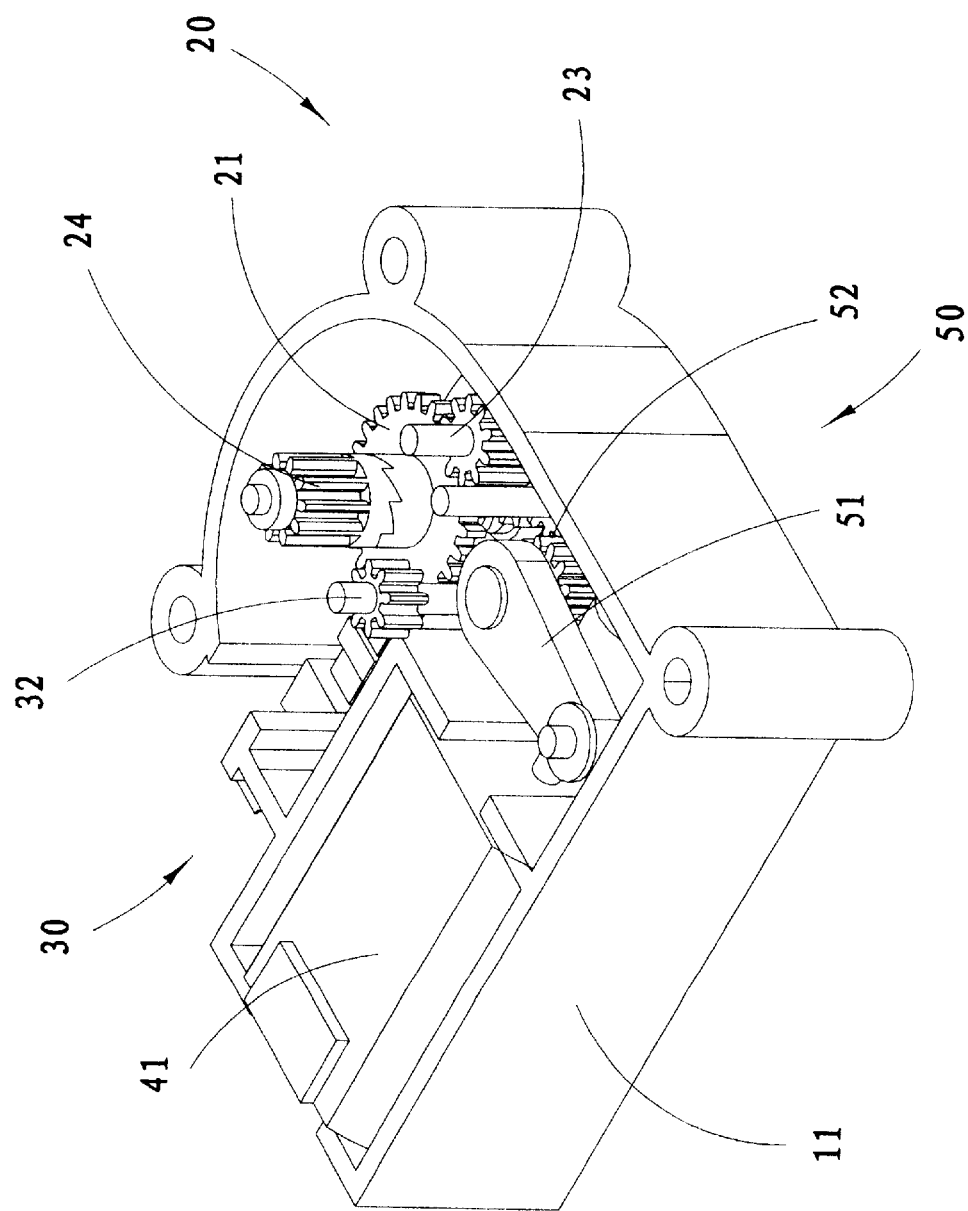
FIG. 5A is a perspective view of a first housing of the automatic motor-output-redirection mechanism according to the above preferred embodiment of the present invention.
Figure 5C:
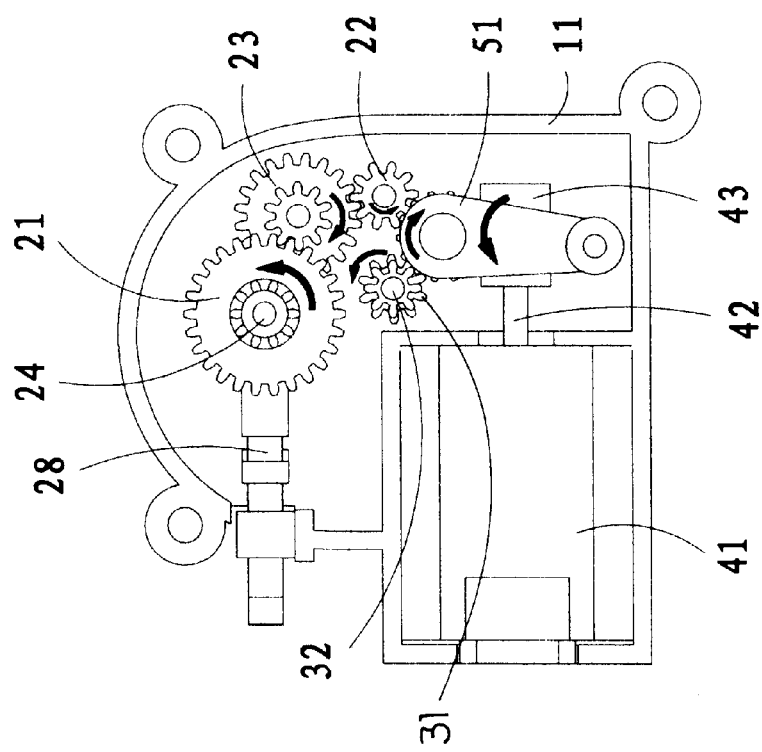
FIG. 5C is illustrates mechanical motions on the first housing of the automatic motor-output-redirection mechanism according to the above preferred embodiment of the present invention, illustrating the worm gear engaging with both the first and second output gear assemblies.

As shown in FIG. 4D, the first Output gear assembly 20, which is embodied as a set of gears trained with each other, comprises a first output gear 21, having a first re-entrant gear surface 211 arranged to be driven to rotate by the cog gear 52 via two conjunction gears 22, 23, a second output 24, having a second re-entrant gear surface 241, spaced apart from the first output gear 21, and a first gear shaft 25 having an upper end portion firmly and coaxially mounted to the second output gear 24 and a lower end portion coaxially mounted to the first output gear 21 in a rotatably movable manner. As shown in FIG. 5C, the second output gear 24 is driven to be rotated in a counter clockwise direction when the motor shaft 42 is rotated in the counter clockwise direction according to the gear train arrangement of the first output gear assembly 20.

The first output gear assembly 20 further comprises a locking bushing 26 attached to a lower end of the first gear shaft 25 and a compression spring 27 mounted between the locking bushing 26 and the first output gear 21 for applying an urging pressure against the first output gear 21. When the second output pear 24 is jammed for any mechanical reasons the second re-entrant gear surface 241 of second output gear 24 is capable of slipping relatively to the first re-entrant gear surface 211 of the first output gear 21, so that the first output gear 21 will not be jammed. When the first output gear 21 is slipping, the first output gear 21 is forced to slide downward and trigger a clutch switch 28 mounted thereunder wherein the clutch switch 28 is configured to feedback a jamming signal to the motor control unit 2 for emergency stop purpose.

As shown in FIGS. 4A and 4B, the second output gear assembly 30, which is embodied as a set of gears trained with each other, comprises a first driven gear 31, a second driven gear 32 spaced apart with the first driven gear 31, and a driven shaft 33 having two ends firmly and coaxially mounted to the first and second driven gears 31, 32 respectively wherein the first driven gears 31 is rotatably engaged with the worm gear 43 in such a manner that when the first driven gear 31 is driven to be rotate by the worm gear 43, the second driven gear 32 is driven to be rotate through the driven shaft 33, according to the gear train arrangement of the second output gear assembly 30. Furthermore, the second driven gear 32 is extended to a position above the first housing 12 to communicate with the indexing gear 70.

Accordingly, the second Output gear assembly 30 is coupled with the indexing gear 70 in such a manner that the turntable base 63 is driven to rotate by the motor shaft 42 through the second output gear assembly 30 and the indexing gear 70.

Figure 5B:
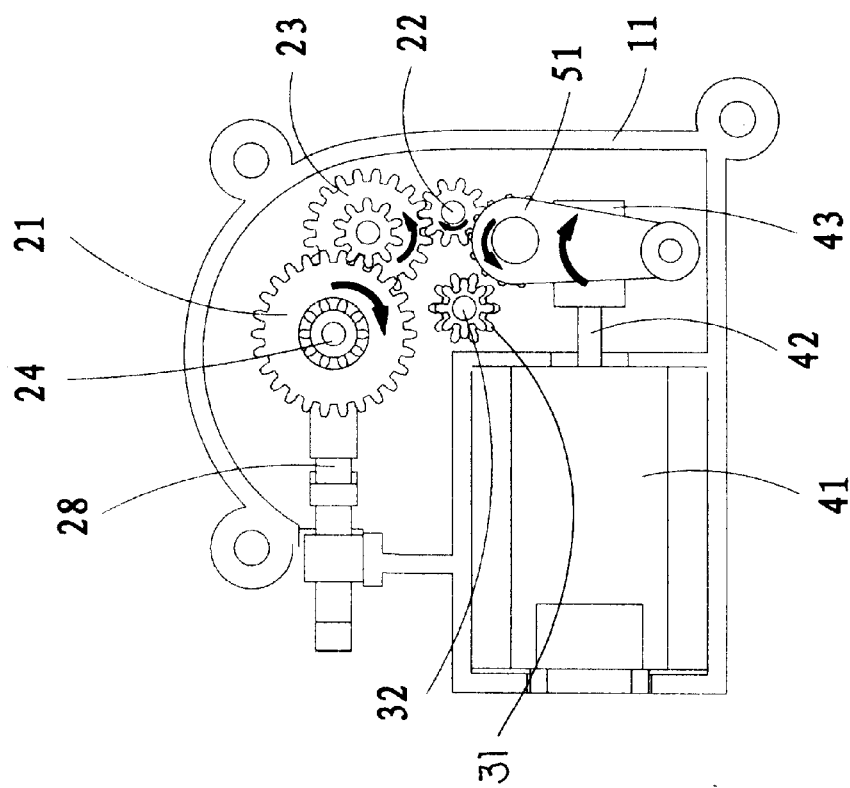
FIG. 5B illustrates mechanical motions on the first housing of the automatic motor-output-redirection mechanism according to the above preferred embodiment of the present invention, illustrating the worm gear engaging with the first output gear assembly only.
Figure 6B:
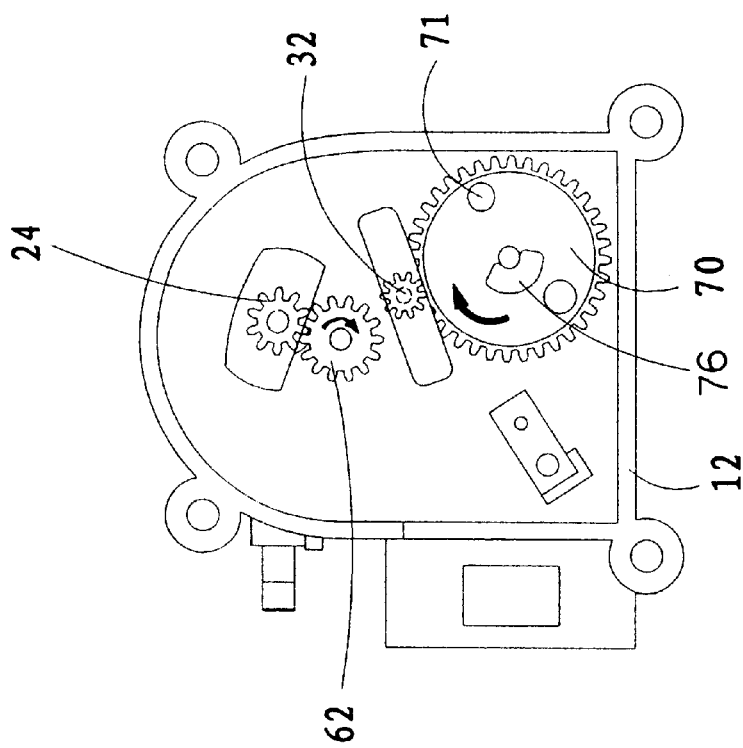
FIGS. 6A and 6B illustrate mechanical motions on a second housing of the automatic motor-output-redirection mechanism according to the above preferred embodiment of the present invention, illustrating the turntable assembly being detached from the second housing.
Figure 6A:
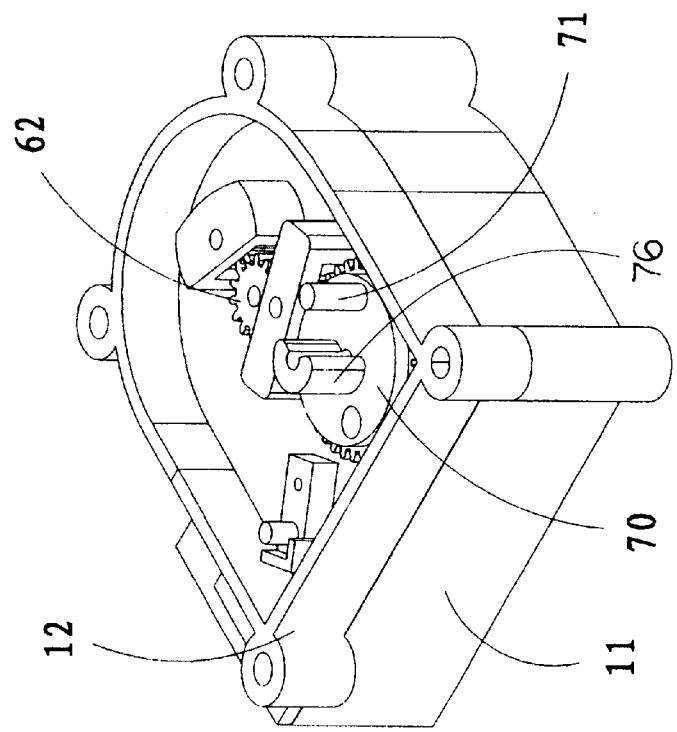

As shown in FIG. 5B, when the motor shaft 42 is rotated in the clockwise direction, the worm gear 43 drives the cog gear 52 to rotate in the counter clockwise which moves the floating arm 51 to a position engage with the first output gear assembly 20 only. In other words, the second output gear assembly 30 will not be driven when the motor shaft 42 is rotated in the clockwise direction.

As shown in FIG. 5C, when the motor shaft 42 is rotated in the counter clockwise direction, the worm gear 43 drives the cog gear 52 to rotate in the clockwise which moves the floating arm 51 to a position engage with both the first and second output gear assemblies 20, 30 at the same time. Therefore, the first output gear 21 of the first output gear assembly 20 and the first driven gear 31 of the second output gear assembly 52 are respectively driven to be rotated by the worm gear 43 at the same time. FIG. 13 illustrates the mechanical movements in the base 11 according to the rotational movement of the motor shaft 42.

It is worth to mention that the worm gear 43 is adapted to be simply substituted by a spur gear (not shown in Figures) in order to function as a driving means to drive floating arm 51 to engage with the first and second output gear assemblies 20, 30 respectively as it is mentioned above.

Furthermore, the turntable assembly 60 further comprises a driving gear 64 coaxially affixed to an upper portion of the primary output shaft 61 and a second rotatable output assembly 65 arranged to rotatably engage the driving gear 64 with one of the planetary output shafts 80 in such a manner that when the primary output shaft 61 is rotated to drive the driving gear 64 to rotate in a counter clockwise direction, the respective planetary output shaft 80 is driven to be rotated through the second rotatable output assembly 65.

Figure 4E:
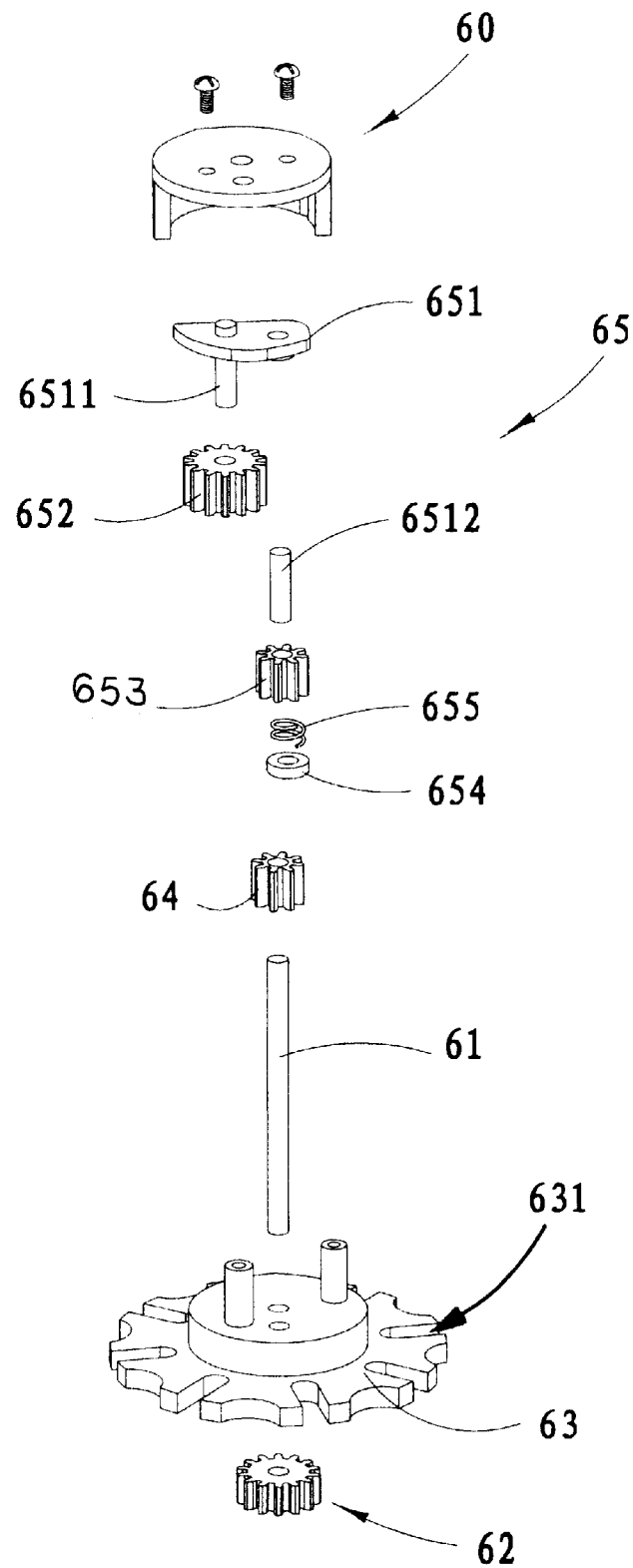
FIG. 4E is an exploded perspective view of a turntable assembly of the automatic motor-output-redirection mechanism according to the above preferred embodiment of the present invention.

As shown in FIG. 4E, the second rotatable output assembly 65, which is a set of gears trained with each other, comprises a swinging arm 651 having a supporting axle 6511 and a supporting shaft 6512 extending downwardly at two ends of the swinging arm 651 respectively, and a first idle gear 652 rotatably and coaxially mounted on the supporting axle 6511 arranged to rotatably engage with the driving gear 64, and wherein the second idle gear 653 rotatably and coaxially mounted on the supporting shaft 6512 and arranged to rotatably engage the first idle gear 652 with the respective planetary output gear 81 so as to drive the respective planetary output shaft 80 to rotate when the driving gear 64 is rotated.

In other words, the swinging arm 651 has one end coupling with the primary output shaft 61 via the first idle gear 652 and another opposing end mounted to the second idle gear 653 in such a manner that when the primary output shaft 61 is rotated in a clockwise direction which is the disengagement stage, the swinging arm 651 is driven to move the second idle gear 653 toward to the primary output shaft 61 so as to disengage with the planetary output shafts 80, and when the primary output shaft 61 is rotated in a counter clockwise direction which is the engagement stage, the swinging arm 651 is driven to move the second idle gear 653 away from the primary output shaft 61 to a position that the second idle gear 653 is engaged with one of the planetary output shaft 80.

The second rotatable output assembly 65 further comprises a bushing 654 affixed to a bottom end of the supporting shaft 6512 and a compressing spring 655 mounted between the bushing 654 and the second idle gear 653 for applying an urging pressure against the second idle gear 653.

In order to drive the turntable base 63 to rotate by the indexing gear 70, the indexing gear 70 has a guiding arm 71 upwardly and integrally extended therefrom and the turntable base 63 has a plurality of guiding through grooves 631 radially extended therefrom wherein the guiding arm 71 is driven to receive in each of the guiding through grooves 631 and to push the turntable base 63 to rotate while the guiding arm 71 is left the corresponding guiding through groove 631.

Figure 7B:
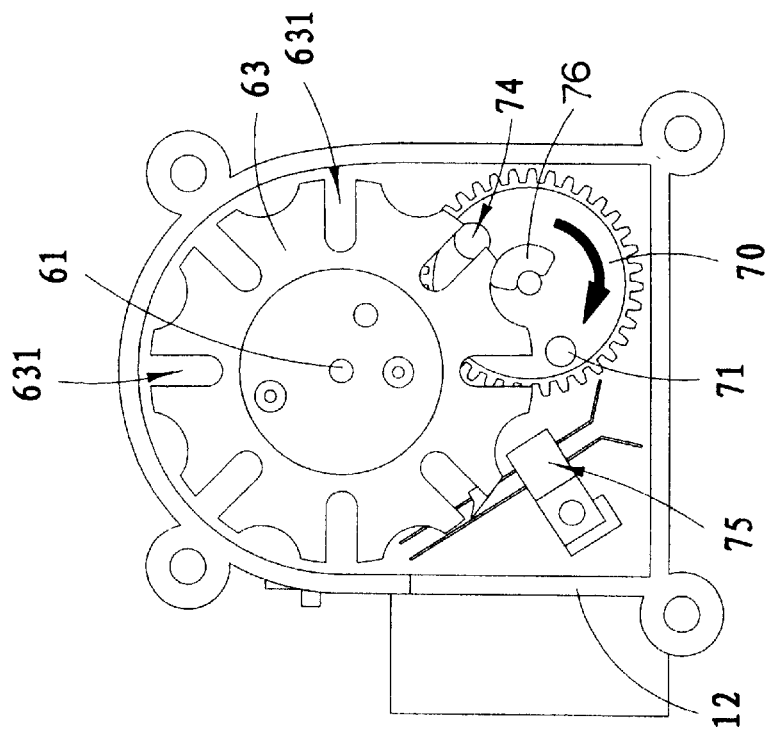
FIGS. 7A and 7B illustrate an indexing gear engaged with a turntable base in an entry position according to the above preferred embodiment of the present invention.
Figure 7A:
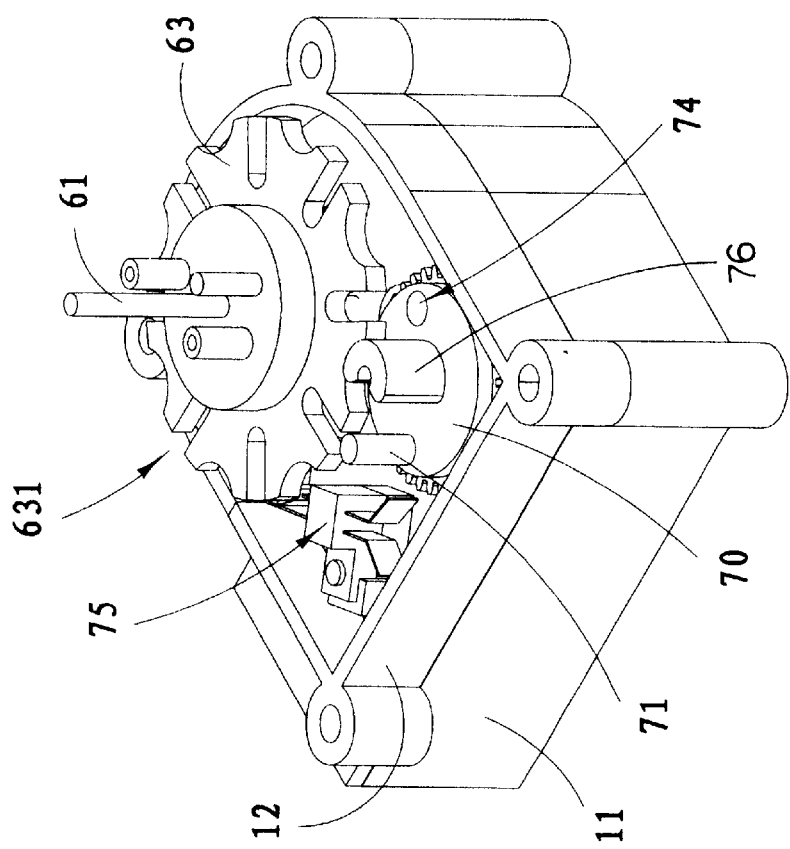
Figure 8B:
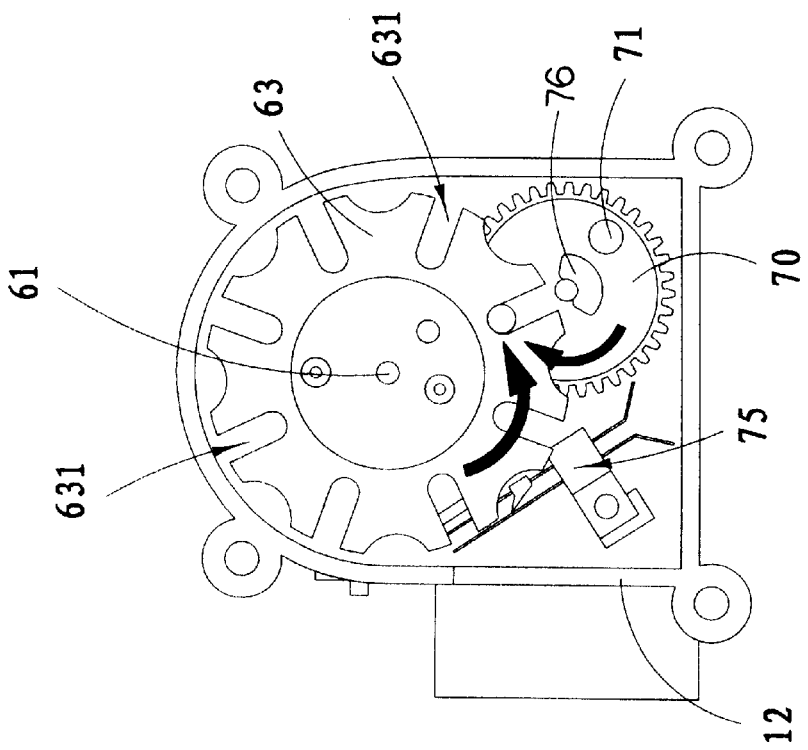
FIGS. 8A and 8B illustrate the indexing gear engaged with the turntable base in a transition position according to the above preferred embodiment of the present invention.
Figure 8A:
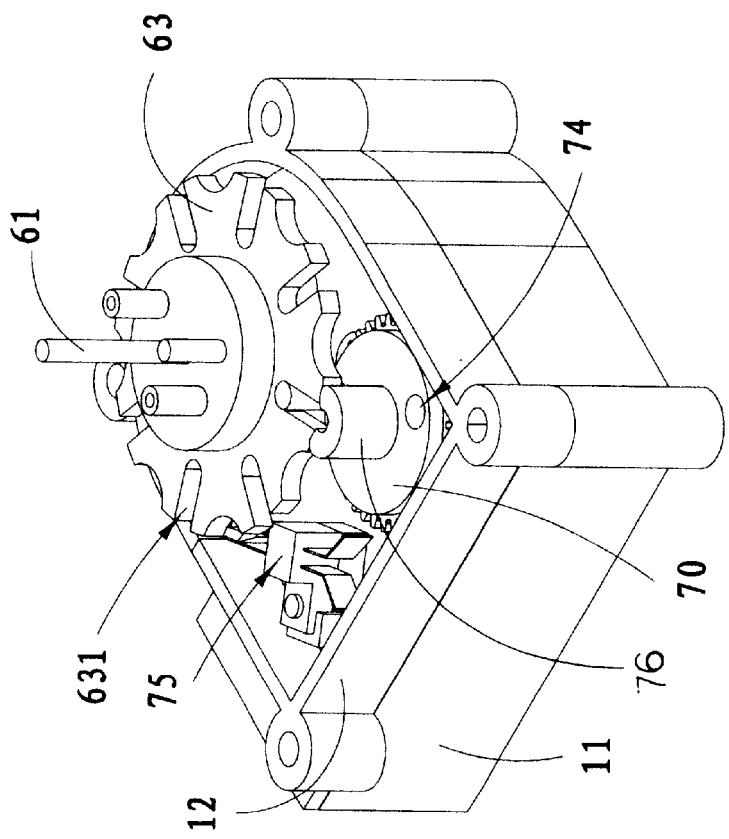
Figure 9B:
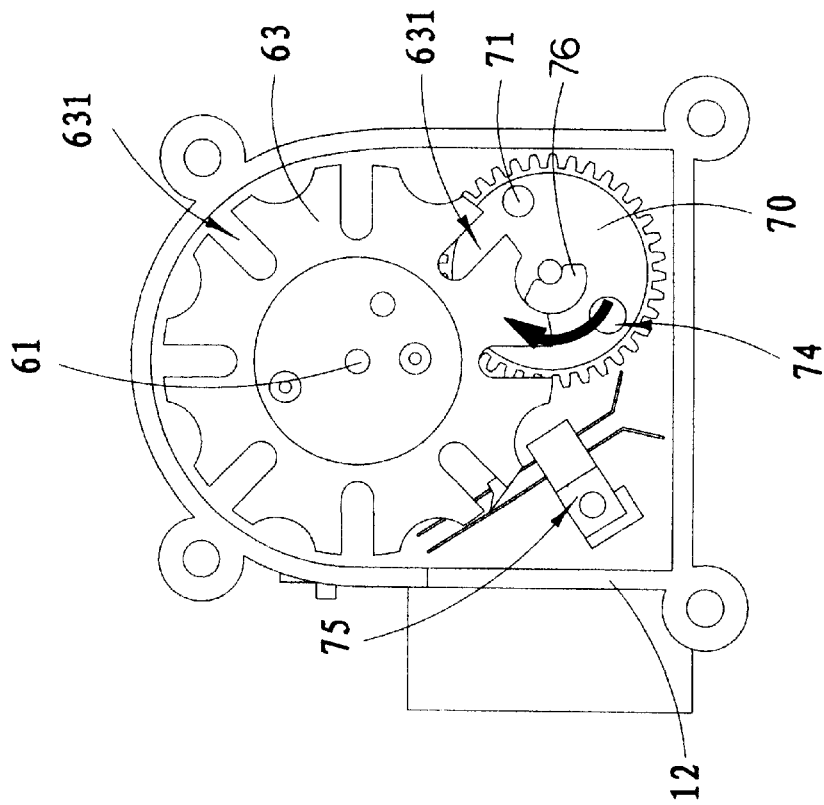
FIGS. 9A and 9B illustrate the indexing gear engaged with the turntable base in an exit position according to the above preferred embodiment of the present invention.
Figure 9A:
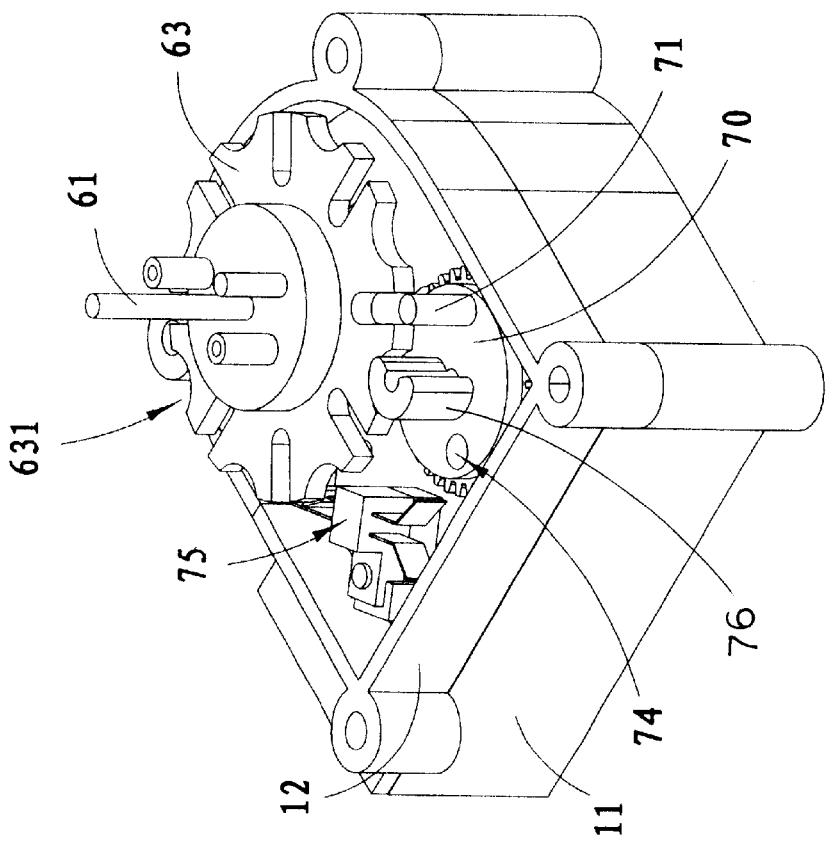

FIGS. 7A and 7B illustrate the guiding arm 71 in an entry position that the guiding arm 71 is moving into respective guiding through groove 631 when the indexing gear 70 is rotated in the clockwise direction. FIGS. 8A and 8B illustrate the guiding arm 71 in a transition position that the guiding arm 71 is moved in the respective guiding through groove 631 so as to drive the turntable base 63 to rotate in the counter clockwise direction. FIGS. 9A and 9B illustrate the guiding arm 71 in an exit position that the guiding arm 71 is moved out of the respective guiding through groove 631 and is moved to the next guiding through groove 631. Accordingly, the turntable base 63 is embodied to have eight guiding through slots 631 evenly extended therefrom in such a manner that the turntable base 63 is rotated ⅛ revolution precisely when the indexing gear 70 is completely rotated in one revolution.

In order to prevent an unwanted lateral movement of the turntable assembly 60 with respect to the indexing gear 70, the indexing gear 70 further comprises a locking cam 76, having a curved outer circumferential surface, upwardly extended from a center of the indexing gear 70, wherein the locking cam 76 is arranged to guide a rotational movement of the turntable base 63 by engaging the outer circumferential surface of the locking cam 76 with an arc shaped outer edge of the turntable base 63, so as to prevent any unwanted rotation of the turntable base 63 accidentally or by vibiation.

The indexing gear 70 further comprises a means 7 for controlling the rotational movement of the turntable base 63 to move the second idle gear 653 toward the corresponding planetary output shaft 80, wherein the controlling means 7 comprises an illuminator 72, such as a LED, supported at a position under the indexing gear 70 and a photo sensor 73 supported at a position above the indexing gear 70 and aligned with the illuminator 72, in such a manner that a light signal from the illuminator 72 is adapted to pass to the photo sensor 73 through an index through hole 74 provided on the indexing gear 70. The light signal will then feedback to the motor control unit 2 to stop the operation of the motor 41 immediately, so as to control the rotational movement of the turntable base 63. Therefore, the rotational movement of the turntable base 63 is adapted to be precisely controlled in each ⅛ revolution movement by the motor control unit 2, such that the second idle gear 653 is adapted to move precisely at a position close to the corresponding planetary output shaft 80 in the disengagement state, so as to drive the corresponding planetary output shaft 80 to rotate in the engagement state.

As shown in FIG. 4B, the turntable base 63 further has a rib 632 protruded from a bottom side thereof wherein the rib 632 is arranged to trigger a home switch 75 once every single revolution of the turntable base 63. The home switch 75, which is supported on the first housing 12, is configured to feedback a home switch signal to the motor control unit 2 for checking the initial position of the turntable base 63 during power on initially. FIG. 14 illustrates the mechanical movements in the first housing 12.

It is worth to mention that both the primary output shaft 61 and the turntable base 63 are driven to rotate by the single motor 41. However, it is obvious that the primary output shaft 61 and the turntable base 63 are adapted to be driven to rotate by two motors respectively because the purpose of the turntable base 63 is to move the second idle gear 653 to engage with the desired planetary output shalt 80. Of course, the casing 10 is adapted to save much installation space when only one motor 41 is used.

As shown in FIG. 4A, the second housing 13 has a central through hole 131 and a plurality of coaxial through slots 132 provided thereon respectively wherein the planetary output shafts 80 are rotatably mounted on the second housing 13 through the coaxial through slots 132 respectively and the second rotatable output assembly 65 of the turntable assembly 60 is extended to a position that above the second housing 13 through the central through hole 131 for rotatably engaging with each of the planetary output shafts 80.

Figures 10A, 10B:
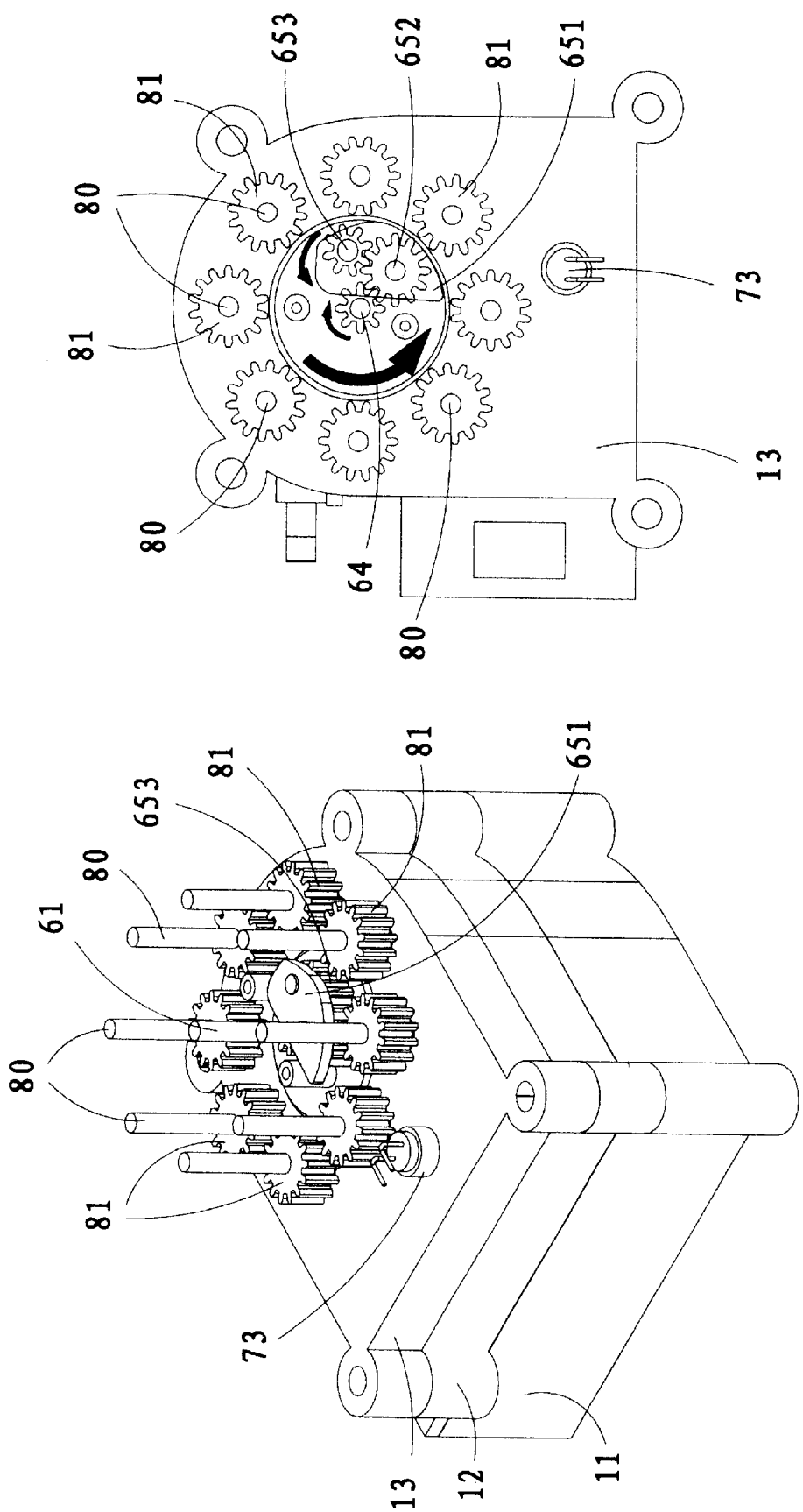
FIGS. 10A and 10B illustrate mechanical movements in a third housing of the automatic motor-output-redirection mechanism according to the above preferred embodiment of the present invention.

As shown in FIGS. 10A and 10B, when the motor shaft 42 is rotated in the counter clockwise direction to drive the primary output shaft 61 to rotate in the clockwise direction, the driving gear 64 on the primary output shaft 61 drives the first idle gear 652 to rotate in the counter clockwise direction and in turn drives the second idle gear 653 to rotate in the clockwise direction. As the second idle gear 653 rotates in the clockwise direction, the swinging arm 651 is forced to inwardly swing towards a center of the primary output shaft 61, in such a manner that the second idle gear 653 is driven to disengage with the planetary output gears 81. As a result, only the primary output shaft 61 is driven to be rotated. FIGS. 11A and 11B illustrate the swinging arm 651 is detached from the second rotatable assembly 65 in order to clearly indicate the gear train arrangement between the second rotatable assembly 65 and the planetary output gears 81.

Figure 12B:
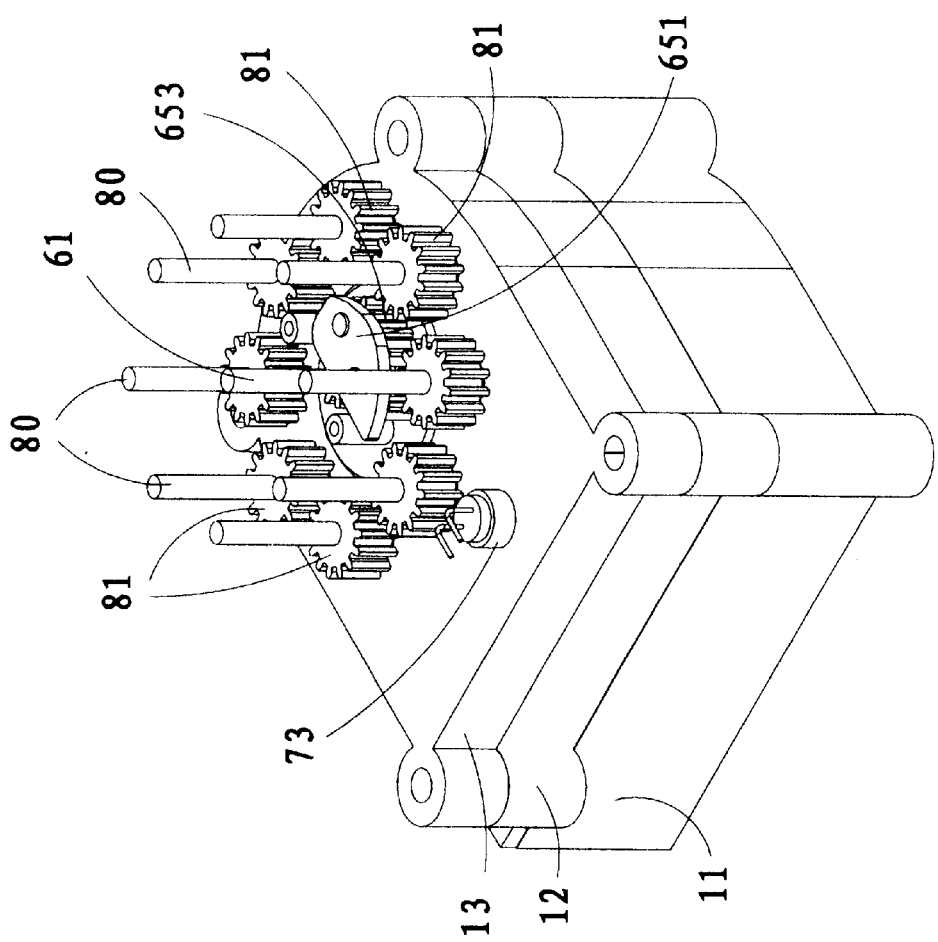
FIGS. 12A and 12B illustrate the cog gear engaged with one of the planetary output gears according to the above preferred embodiment of the present invention.
Figure 12A:
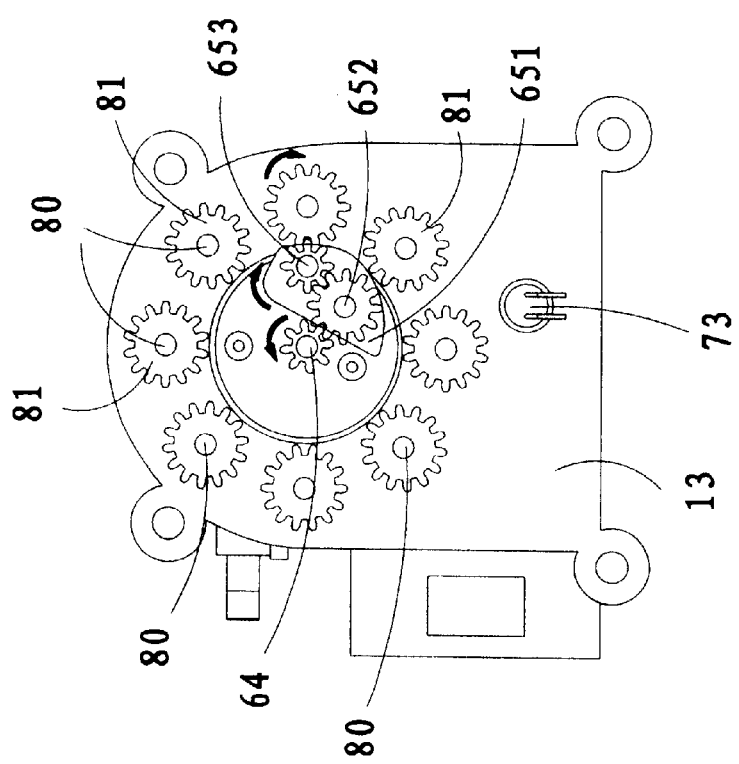

As shown in FIGS. 12A and 12B, when the motor shaft 42 is rotated in the clockwise direction to drive the primary output shaft 61 to rotate in the counter clockwise direction, the driving gear 64 on the primary output shalt 61 drives the list idle ear 652 to rotate in the clockwise direction and in turn drives the second idle gear 653 to rotate in the counter clockwise direction. As the second idle gear 653 rotates in the counter clockwise direction, the swinging arm 651 is forced to outwardly swing away from the center of the primary output shaft 61, in such a manner that the second idle gear 653 is driven to engage with one of the planetary output gears 81, so as to drive the corresponding planetary output shaft 80 to rotate. FIG. 15 illustrates the mechanical movements in the second housing 13.

Furthermore, when the turntable base 63 is driven to be rotated, the second idle gear 653 is disengaged with the planetary output gears 81, so as to selectively move the second idle gear 653 to a position to engage with the desired planetary output gear 81 while the turntable base 63 is stopped rotating. It is worth to mention that the rotational movement of the turntable base 63 is adapted to be controlled by the motor control unit 2 in such a manner that the rotational movement of the turntable base 63 is capable of being stop at a position that the second idle gear 653 is rotatably engaged with the corresponding planetary output gear 81. In other words, each of the planetary output shafts 80 is adapted to be selected to rotate by controlling, the position to the second rotatable assembly 65 according to the rotational movement of the turntable base 63.

Therefore, by connecting the planetary output shafts 80 to a plurality of mechanical devices, each of the mechanical devices is adapted to be controlled individually according to the rotational movement of each of the planetary output shafts 80. FIG. 16 illustrates a summary of the mechanical movement of the automatic motor-output-redirection mechanism of the present invention.

According to the preferred embodiment, there are eight planetary output shafts 80. Therefore, totally eight mechanical devices can be controlled by the single motor 41. Thus, by controlling the motor shaft 42 in the clockwise direction and the counter clockwise direction, more than two different mechanical works can be outputted through the automatic motor-output-redirection mechanism of the present invention.

While the foregoing description and diagram describe the preferred embodiment of the present invention, it should be appreciated that certain obvious modifications, variations, and substitutions may be made without departing from the spirit and scope of the present invention. For example, the clockwise and counter clockwise directions of the motor shaft can be modified to control the rotational movements of the primary output shaft and the planetary output shafts according to the gear chain arrangements thereof.

What is claimed is:

1. An automatic motor-output-redirection system, comprising:
   a motor control unit comprising a power supply and a control panel; and
   an automatic motor-output-redirection mechanism, comprising:
      a casing having a motor cavity;
      a motor assembly, which is supported in said motor cavity of said casing and electrically connected to said power supply, wherein said motor assembly is controlled by said control panel for providing a rotational shaft force;
      a turntable assembly, comprising:
         a turntable base rotatably supported in said casing wherein said turntable base is arranged to be driven to rotate by said motor assembly;
         a primary output shaft, which is coaxially mounted to said turntable base in a rotatably movable manner, having an upper portion extended to an exterior of said casing and a lower end coupling with said motor assembly to drive said upper portion of said primary output shaft to rotate; and
         a second rotatable output assembly comprising a second idle gear which is rotatably supported on said turntable base to couple with said primary output shaft; and
      a plurality of the planetary output shafts coaxially supported by said casing at positions around said turntable assembly, wherein said primary output shaft is rotated to drive said second idle gear to move between an engagement position and a disengagement position, wherein at said engagement position, said turntable base is rotatably moved to a position that said second idle gear is engaged with one of said planetary output shafts to drive said corresponding planetary output shalt to rotate, and at said disengagement position, said second idle gear is disengaged with said planetary output shafts, so that each of said planetary output shafts is in an idle manner.

2. An automatic motor-output-redirection system, as recited in claim 1, wherein said second rotatable output assembly further comprises a swinging arm having one end coupling with said primary output shaft and another opposing, end mounted to said second idle gear in such a manner that when said primary output shaft is rotated in a clockwise direction which is said disengagement stage, said swinging arm is driven to move said second idle gear toward to said primary output shaft so as to disengage with said planetary output shafts, and when said primary output shaft is rotated in a counter clockwise direction which is said engagement stage, said swinging arm is driven to move said second idle gear away from said primary output shaft to a position that said second idle gear is engaged with one of said planetary output shaft.

3. An automatic motor-output-redirection system, as recited in claim 1, wherein said automatic motor-output-redirection mechanism further comprises an indexing gear, which is driven to be rotated by said motor assembly, rotatably supported in said casing to drive said turntable base to rotate in step, wherein said indexing gear has a guiding arm upwardly extended therefrom and said turntable base has a plurality of guiding through grooves radially extended therefrom in such a manner that when said indexing gear is rotated, said guiding arm is driven to receive in each of said guiding through grooves and to push said turntable base to rotate while said guiding arm is left said corresponding guiding through groove.

4. An automatic motor-output-redirection system, as recited in claim 2, wherein said automatic motor-output-redirection mechanism further comprises an indexing gear, which is driven to be rotated by said motor assembly, rotatably supported in said casing to drive said turntable base to rotate in step, wherein said indexing gear has a guiding arm upwardly extended therefrom and said turntable base has a plurality of guiding through grooves radially extended therefrom in such a manner that when said indexing gear is rotated, said guiding arm is driven to receive in each of said guiding through grooves and to push said turntable base to rotate while said guiding arm is left said corresponding guiding through groove.

5. An automatic motor-output-redirection system, as recited in claim 1, wherein said motor assembly comprises a motor disposed in said motor cavity, a motor shaft operatively extended from said motor, and a worm gear affixed to a free end of said motor shaft to couple with said primary output shaft in such a manner that said primary output shaft is adapted to be rotated in a clockwise direction and a counter clockwise direction while said motor shaft is rotated in a counter clockwise direction and a clockwise direction respectively.

6. An automatic motor-output-redirection system, as recited in claim 2, wherein said motor assembly comprises a motor disposed in said motor cavity, a motor shaft operatively extended from said motor, and a worm gear affixed to a free end of said motor shaft to couple with said primary output shaft in such a manner that said primary output shaft is adapted to be rotated in a clockwise direction and a counter clockwise direction while said motor shaft is rotated in a counter clockwise direction find a clockwise direction respectively.

7. An automatic motor-output-redirection system, as recited in claim 3, wherein said motor assembly comprises a motor disposed in said motor cavity, a motor shaft operatively extended from said motor, and a worm gear affixed to a free end of said motor shaft to couple with said primary output shaft in such a manner that said primary output shaft is adapted to be rotated in a clockwise direction and a counter clockwise direction while said motor shaft is rotated in a counter clockwise direction and a clockwise direction respectively.

8. An automatic motor-output-redirection system, as recited in claim 4, wherein said motor assembly comprises a motor disposed in said motor cavity, a motor shaft operatively extended from said motor, and a worm car affixed to a free end of said motor shaft to couple with said primary output shaft in such a manner that said primary output shaft is adapted to be rotated in a clockwise direction and a counter clockwise direction while said motor shaft is rotated in a counter clockwise direction and a clockwise direction respectively.

9. An automatic motor-output-redirection system, as recited in claim 5, wherein said automatic motor-output-redirection mechanism further comprises a first and second output gear assemblies, which are two sets of gears respectively, coupling with said primary output shaft and said turntable base respectively, and a floating arm pivotally supported in said base wherein said floating arm has one end selectively engaged with said first and second output gear assemblies, in such a manner that when said motor shaft is rotated in a clockwise direction, said free end of said floating arm is moved to engage with said first output gear assembly so as to drive said primary output shaft to rotate in a counter clockwise direction, and when said motor shaft is rotated in a counter clockwise direction, said free end of said floating arm is moved to engage with said first and second output gear assemblies so as to drive said primary output shaft to rotate in a clockwise direction and said turntable base to rotate respectively.

10. An automatic motor-output-redirection system as recited in claim 6, wherein said automatic motor-output-redirection mechanism further comprises a first and second output gear assemblies, which are two sets of gears respectively, coupling with said primary output shaft and said turntable base respectively, and a floating arm pivotally supported in said base wherein said floating arm has one end selectively engaged with said first and second output gear assemblies, in such a manner that when said motor shaft is rotated in a clockwise direction, said free end of said floating arm is moved to engage with said first output gear assembly so as to drive said primary output shaft to rotate in a counter clockwise direction, and when said motor shaft is rotated in a counter clockwise direction, said free end of said floating arm is moved to engage with said first and second output gear assemblies so as to drive said primary output shaft to rotate in a clockwise direction and said turntable base to rotate respectively.

11. An automatic motor-output-redirection system, as recited in claim 7, wherein said automatic motor-output-redirection mechanism further comprises a first and second output gear assemblies, which are two sets of gears respectively, coupling with said primary output shaft and said turntable base respectively, and a floating arm pivotally supported in said base wherein said floating arm has one end selectively engaged with said first and second output gear assemblies, in such a manner that when said motor shaft is rotated in a clockwise direction, said free end of said floating arm is moved to engage with said first output gear assembly so as to drive said primary output shaft to rotate in a counter clockwise direction, and when said motor shaft is rotated in a counter clockwise direction, said free end of said floating arm is moved to engage with said first and second output gear assemblies so as to drive said primary output shaft to rotate in a clockwise direction and said turntable base to rotate respectively.

12. An automatic motor-output-redirection system, as recited in claim 8, wherein said automatic motor-output-redirection mechanism further comprises a first and second output gear assemblies, which are two sets of gears respectively, coupling with said primary output shaft and said turntable base respectively, and a floating arm pivotally supported in said base wherein said floating arm has one end selectively engaged with said first and second output gear assemblies, in such a manner that when said motor shaft is rotated in a clockwise direction, said free end of said floating arm is moved to engage with said first output gear assembly so as to drive said primary output shaft to rotate in a counter clockwise direction, and when said motor shaft is rotated in a counter clockwise direction, said free end of said floating arm is moved to engage with said first and second output gear assemblies so as to drive said primary output shaft to rotate in a clockwise direction and said turntable base to rotate respectively.

13. An automatic motor-output-redirection system, as recited in claim 11, wherein said second output gear assembly is coupled with said indexing gear in such a manner that said turntable base is driven to rotate by said motor shaft through said second output gear assembly and said indexing gear.

14. An automatic motor-output-redirection system, as recited in claim 12, wherein said second output gear assembly is coupled with said indexing gear in such a manner that said turntable base is driven to rotate by said motor shaft through said second output gear assembly and said indexing gear.

15. An automatic motor-output-redirection system, as recited in claim 4, wherein said indexing gear further comprises a locking cam, having a curved outer circumferential surface, upwardly extended from a center of said indexing gear, wherein said locking cam is arranged to guide a rotational movement of said turntable base by engaging said outer circumferential surface of said locking cam with an arc shaped outer edge of said turntable base.

16. An automatic motor-output-redirection system, as recited in claim 8, wherein said indexing gear further comprises a locking cam, having a curved outer circumferential surface, upwardly extended from a center of said indexing gear, wherein said locking cam is arranged to guide a rotational movement of said turntable base by engaging said outer circumferential surface of said locking cam with an arc shaped outer edge of said turntable base.

17. An automatic motor-output-redirection system, as recited in claim 14, wherein said indexing gear further comprises a locking cam, having a curved outer circumferential surface, upwardly extended from a center of said indexing gear, wherein said locking cam is arranged to guide a rotational movement of said turntable base by engaging said outer circumferential surface of said locking cam with an arc shaped outer edge of said turntable base.

18. An automatic motor-output-redirection system as recited in claim 4, wherein said indexing gear further comprises a means for controlling a rotational movement of said turntable base to move said second idle gear toward said corresponding planetary output shaft.

19. An automatic motor-output-redirection system, as recited in claim 8, wherein said indexing gear further comprises a means for controlling a rotational movement of said turntable base to move said second idle gear toward said corresponding planetary output shaft.

20. An automatic motor-output-redirection system, as recited in claim 14, wherein said indexing gear further comprises a means for controlling a rotational movement of said turntable base to move said second idle gear toward said corresponding planetary output shaft.

* * * * *